United States Patent
Pazhyannur et al.

(10) Patent No.: US 9,832,808 B2
(45) Date of Patent: Nov. 28, 2017

(54) METHOD TO PROVIDE DUAL CONNECTIVITY USING LTE MASTER ENODEB AND WI-FI BASED SECONDARY ENODEB

(71) Applicant: Cisco Technology, Inc., San Jose, CA (US)

(72) Inventors: Rajesh Pazhyannur, Fremont, CA (US); Vivek Jha, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 208 days.

(21) Appl. No.: 14/835,985

(22) Filed: Aug. 26, 2015

(65) Prior Publication Data

US 2016/0157293 A1    Jun. 2, 2016

(30) Foreign Application Priority Data

Dec. 2, 2014  (IN) .......................... 1263/KOL/2014

(51) Int. Cl.
| | |
|---|---|
| *H04W 76/02* | (2009.01) |
| *H04W 76/04* | (2009.01) |
| *H04W 84/12* | (2009.01) |
| *H04W 92/20* | (2009.01) |
| *H04W 76/06* | (2009.01) |

(52) U.S. Cl.
CPC ....... *H04W 76/046* (2013.01); *H04W 76/025* (2013.01); *H04W 76/064* (2013.01); *H04W 84/12* (2013.01); *H04W 92/20* (2013.01)

(58) Field of Classification Search
None
See application file for complete search history.

(56) References Cited

U.S. PATENT DOCUMENTS

| | | |
|---|---|---|
| 8,971,906 B2 | 3/2015 | Jose et al. |
| 9,014,091 B2 | 4/2015 | Sajadieh |
| | (Continued) | |

OTHER PUBLICATIONS

"Requirements and Coexistence Topics for LTE-U", 3GPP LTE-U Workshop, Sophia Antipolis, Jun. 13, 2014, RWS-140010, Sony Mobile Communications, 11 pages.

(Continued)

*Primary Examiner* — Duc Duong
(74) *Attorney, Agent, or Firm* — Edell, Shapiro & Finnan, LLC

(57) ABSTRACT

A first network device may operate as a base station in a wireless wide area network (WWAN) and may establish a WWAN connection with a user device. A media access control (MAC) address of the user device may be obtained and sent to a second network device which operates an access point for a wireless local area network (WLAN). An acknowledgement containing a first service set identifier of the WLAN may be received from the second network device and sent to the user device to set up a secondary connection. An identifier for ordered data communication may used to enable in order communication through both the first and the second network devices. Data to be transmitted to the user device may be split into a first portion and a second portion, and transmitted through the WWAN connection and to the second network device for transmission to the user device via the WLAN respectively.

20 Claims, 13 Drawing Sheets

(56) References Cited

U.S. PATENT DOCUMENTS

| | | | |
|---|---|---|---|
| 9,055,576 | B2 | 6/2015 | Chen et al. |
| 2014/0369201 | A1 | 12/2014 | Gupta et al. |
| 2015/0085800 | A1* | 3/2015 | Sivanesan ............. H04W 24/04 |
| | | | 370/329 |
| 2015/0163848 | A1 | 6/2015 | Lin et al. |
| 2015/0181638 | A1 | 6/2015 | Tabet et al. |
| 2016/0057585 | A1* | 2/2016 | Horn ..................... H04L 12/189 |
| | | | 370/312 |
| 2016/0128110 | A1* | 5/2016 | Sirotkin ............. H04W 76/022 |
| | | | 370/329 |
| 2016/0142970 | A1* | 5/2016 | Chen .................. H04W 76/025 |
| | | | 370/328 |
| 2016/0219475 | A1* | 7/2016 | Kim .................... H04W 76/025 |
| 2016/0302122 | A1* | 10/2016 | Masini ................ H04L 61/1511 |
| 2017/0127473 | A1* | 5/2017 | Virtej .................. H04W 76/068 |
| 2017/0134123 | A1* | 5/2017 | Ozturk ................. H04L 1/1628 |

OTHER PUBLICATIONS

"CableLabs Perspectives on LTE-U Coexistence with Wi-Fi and Operational Modes for LTE-U", CableLabs, Rogers, Benu Networks, Ruckus Wireless, RAN64, Sophia-Antipolis, FR, Cable Television Laboratories, Inc. 2014, 15 pages.

"LTE in unlicensed spectrum", Jun. 19, 2014—Sophia Antipolis, France, http://www.3gpp.org/news-events/3gpp-news/1603-lte_in_unlicensed, 6 pages.

"Understanding 3GPP Release 12: Standards for HSPA+ and LTE Enhancements", 3GPP Release 12, Executive Summary, Feb. 2015, 4G Americas, 13 pages.

"LTE Small Cell Enhancement by Dual Connectivity", Outlook Visions and research directions for the Wireless World, Nov. 2014, No. 15, Wireless World Research Forum, WGC—Communication Architectures and Technologies, ISSN 1662-615X, http://www.wwrf.ch, 22 pages.

\* cited by examiner

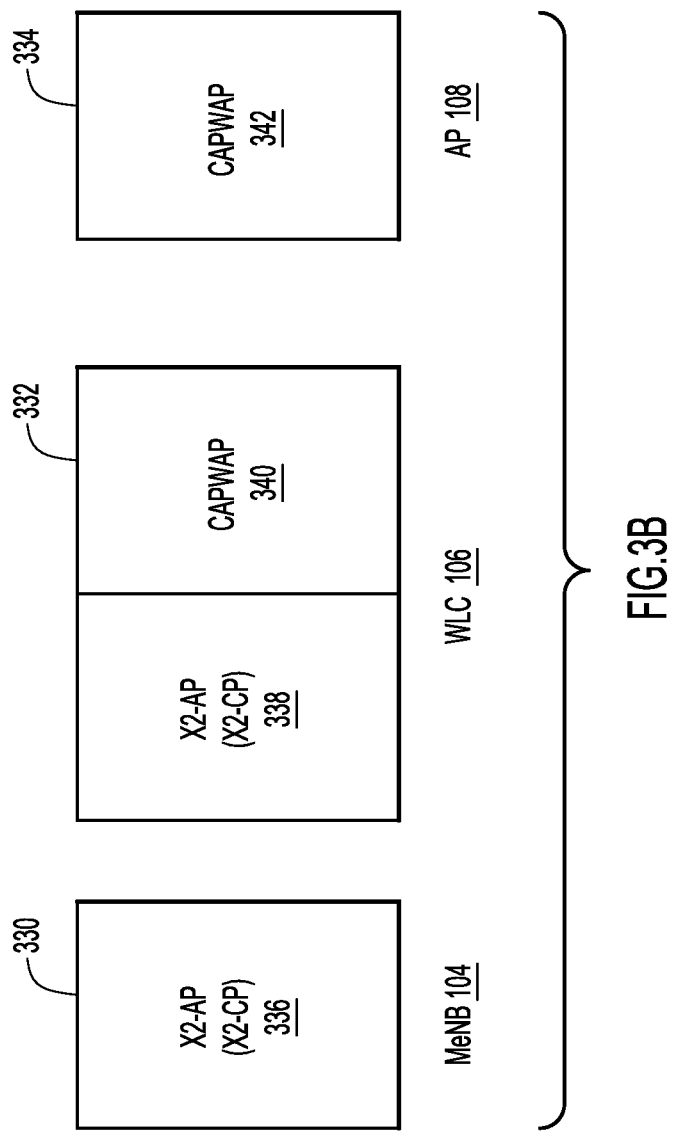

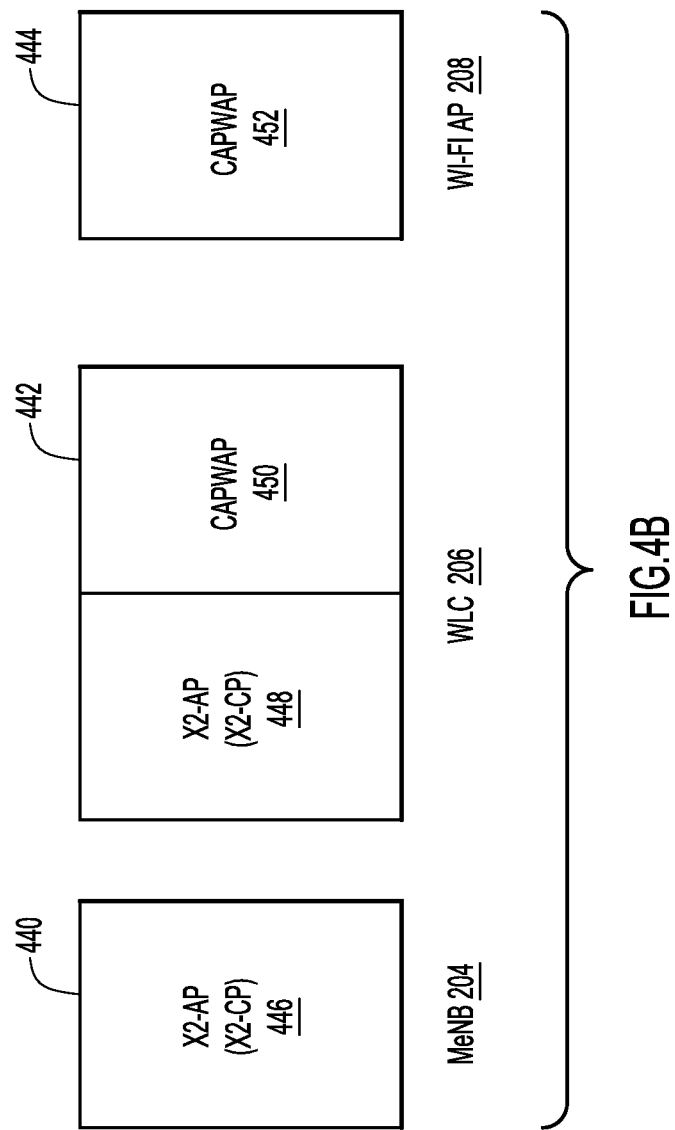

METHOD TO PROVIDE DUAL CONNECTIVITY USING LTE MASTER ENODEB AND WI-FI BASED SECONDARY ENODEB

PRIORITY CLAIM

This application claims priority to Indian Provisional Patent Application No. 1263/KOL/2014, filed Dec. 2, 2014, the entirety of which is incorporated herein by reference.

TECHNICAL FIELD

The present disclosure relates to wireless communication systems and technologies.

BACKGROUND

The Universal Mobile Telecommunications System (UMTS) is a third generation mobile cellular system for networks based on the GSM standard. It specifies a complete network system including the radio access network (UMTS Terrestrial Radio Access Network (UTRAN). The fourth generation (4G) mobile cellular system, also called the Long Term Evolution (LTE) (or 4G LTE) standard, now has a Release 12 that provides a way for User Equipment (UE) to be connected to two Evolved UTRAN (E-UTRAN) NodeBs (eNBs) at the same time using "Dual Connectivity" (DC). An eNB is the hardware that is connected to the mobile phone network that communicates directly with mobile handsets (UEs), like a base transceiver station (BTS) in Global System for Mobile Communications (GSM) networks. In LTE DC, there is a Master eNB (MeNB) that maintains the Radio Resource Control (RRC) connection with the UE and there is a Secondary eNB (SeNB) without RRC. The user data traffic flows via both the Master and the Secondary (thus justifying the name "dual connectivity").

The problem with LTE DC is that it does not take advantage of other existing wireless network services such as Wi-Fi®. On the contrary, LTE has been extended with a proposal for the use of the LTE radio communications technology in unlicensed spectrum, such as the 5 GHz band used by dual-band Wi-Fi equipment. Wi-Fi as used herein refers to any "wireless local area network" (WLAN) product based on IEEE 802.11 standards. The term License Assisted Access (LAA) has been used to describe this development and a workshop has been established to share ideas in LAA-LTE. The study, however, mainly focused on co-existence between LTE and Wi-Fi. For example, some 3GPP and 4G vendors proposed time-division multiplexing between LTE and Wi-Fi to share the same unlicensed spectrum. This is not an efficient use of existing Wi-Fi infrastructures or an efficient integration of LTE and Wi-Fi.

BRIEF DESCRIPTION OF THE DRAWINGS

FIGS. 3A and 3B are block diagram illustrating layer processing in various elements for the Split Bearer data path model according to an example embodiment.

FIGS. 4A and 4B are block diagrams illustrating layer processing in various system elements for the Dual Bearer data path model according to an example embodiment.

DESCRIPTION OF EXAMPLE EMBODIMENTS

Overview

Figure 1:
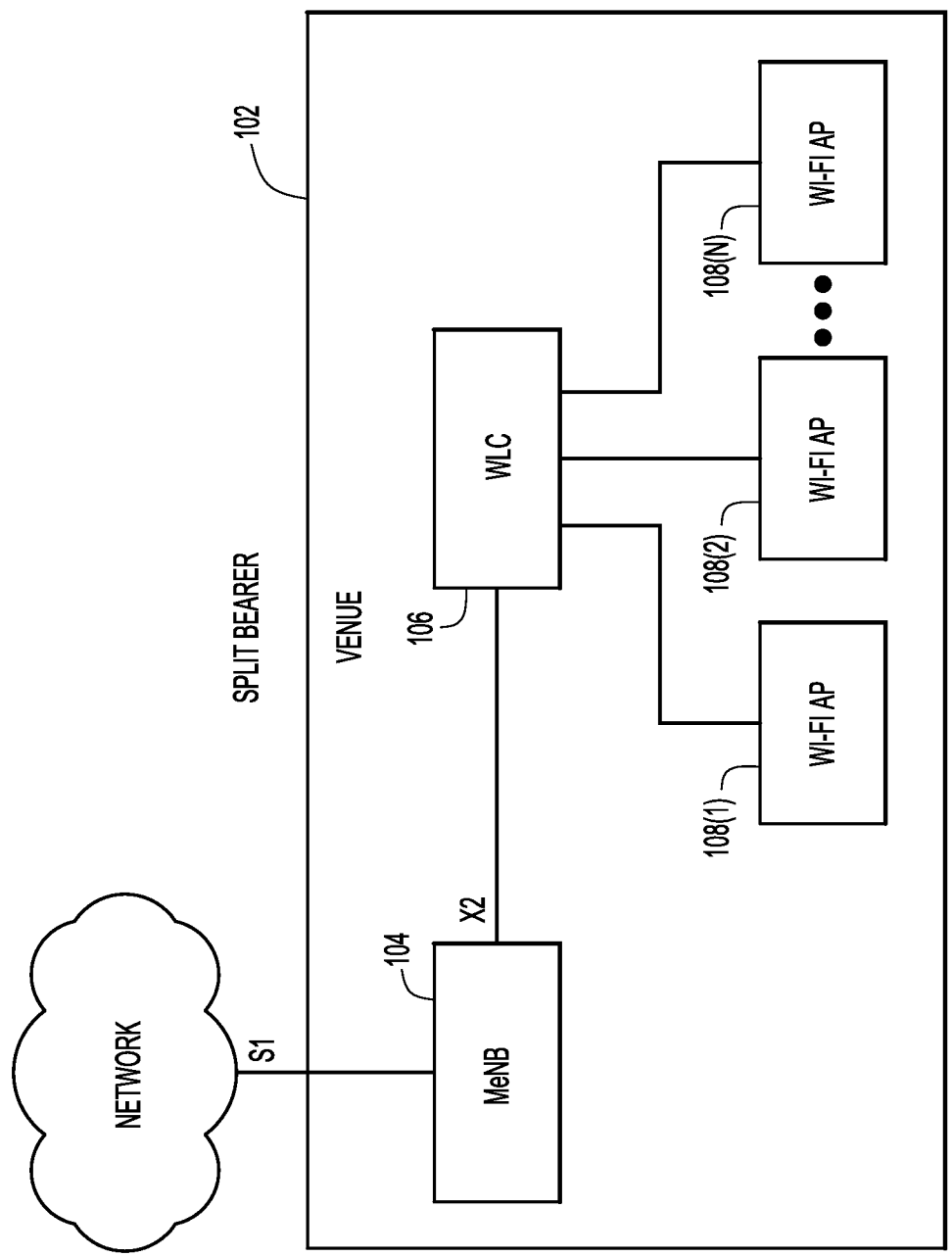
FIG. 1 is a block diagram illustrating a Split Bearer data path model according to an example embodiment.

Presented herein are architectures and methods to provide dual wireless connectivity where one connection is LTE and the other is Wi-Fi. In one model, referred to as Split Bearer, the multiplexing may be implemented at the PDCP layer at the MeNB. In another model, referred to as Dual Bearer, the Wireless LAN Controller (WLC) may implement the PDCP layer and a Wi-Fi aggregation layer to multiplex multiple radio bearers. In one embodiment, a method is provided for a first network device to operate as a base station in a wireless wide area network (WWAN). The first network device may establish a WWAN connection with a user device. A media access control (MAC) address of the user device may be obtained and sent to a second network device which operates as an access point (AP) for a wireless local area network (WLAN). An acknowledgement containing a first service set identifier of the WLAN may be received from the second network device. The first network device may send the first service set identifier to the user device to configure the user device to set up a secondary connection to the first network device via the WLAN and the second network device. An identifier for ordered data communication may be sent to the second network device to enable communication through both the first network device and the second network device. Data to be transmitted to the user device may be split into a first portion and a second portion. The first portion of the data may be transmitted to the user device through the WWAN connection and the second portion of the data may be transmitted to the second network device for transmission to the user device via the WLAN.

Detailed Description

Presented herein are methods by which a 3GPP (3rd Generation Partnership Project) system may be extended to include dual connectivity with one LTE connection and one Wi-Fi® connection. In this LTE/Wi-Fi dual connectivity solution, LTE may be used for the Primary Channel (MeNB) and Wi-Fi may be used for the Secondary Channel (SeNB). Embodiments for such a system may contain no changes to the LTE Core Network beyond what is needed for LTE Dual Connectivity (DC), no changes to the IEEE 802.11 Physical/Media Access Control (MAC) layer, no changes to LTE Physical layer, and provide maximum reuse of LTE Release 12 DC.

Embodiments according to the present disclosure may enable channel aggregation of licensed channels with unlicensed channels. They can serve as better alternatives to LTE-U for a service provider who has a large Wi-Fi deployment to reuse the Wi-Fi infrastructure, and to enable a neutral host solution where different operators can share Wi-Fi at a venue (e.g., a public facility, such as but not limited to, a train station, an airport, a stadium, a hotel, etc.) but still have separate and distinct MeNBs.

Further, embodiments according to the present disclosure may implement enhancements for the Radio Resource Control (RRC) and the Ethernet X2 layer to enable LTE and Wi-Fi dual connectivity. Moreover, a new Wi-Fi Convergence Protocol, which may also be referred as a Wi-Fi Aggregation Protocol, may be implemented to multiplex multiple radio bearers on a single Wi-Fi connection.

In various embodiments according to the present disclosure, aggregation may be implemented at the Packet Data Convergence Protocol (PDCP) layer. The PDCP layer is one of the layers of a radio traffic stack in a Universal Mobile Telecommunications System (UMTS) and performs Internet Protocol (IP) header compression and decompression, transfer of user data and maintenance of sequence numbers for Radio Bearers which are configured for serving radio network subsystem (SRNS). In one embodiment, the PDCP layer may be implemented at the MeNB for the Split Bearer data path model. A load balancer may be implemented to schedule traffic across LTE and Wi-Fi. In another embodiment, the PDCP layer may be implemented at the SeNB for the Dual Bearer data path model.

In some embodiments, aggregation may be implemented at a wireless local area network (WLAN) controller (WLC) to leave the AP unchanged. Wi-Fi dependent RRC messages may be provided for channel aggregation, SeNB setup, etc. In addition, PDCP security may be implemented over Wi-Fi with or without additional IEEE 802.11i security.

Reference first to FIG. 1, there is shown a block diagram illustrating connectivity of a Split Bearer data path model, according to an example embodiment. As shown in FIG. 1, a venue 102 may host one or more network devices that provide the network services offered by a single bearer. The one or more network devices may comprise a MeNB 104, a WLC 106 and one or more Wi-Fi Access Points (APs) 108 (e.g., 108(1), 108(2), to 108(N), N being an integer larger than or equal to one). The single bearer may be referred to as the Split Bearer because it offers both LTE and Wi-Fi services. In should be appreciated that, although not shown, the MeNB 104 may comprise (or operate) one or more LTE APs. Further, the WLC 106 may be hosted in a network device that also hosts one Wi-Fi AP 108. The venue 102 may be any facility either with open access or restricted access by the general public, such as but not limited to, a school campus, a train station, an airport, a stadium, a hotel, etc. Although not shown, any user device (UE) at or near the venue 102 may establish a WWAN connection with the MeNB 104 and a WLAN connection with the WLC 106 (via one of the Wi-Fi AP 108).

In one embodiment, as shown in FIG. 1, the MeNB 104 may be connected to a network via a S1 E-UTRAN network connection and to the WLC 106 by an X2 E-UTRAN network connection. In one embodiment, the network may be an Evolved Packet Core (EPC) and the MeNB 104 may be a MeNB for a small cell.

Figure 2:
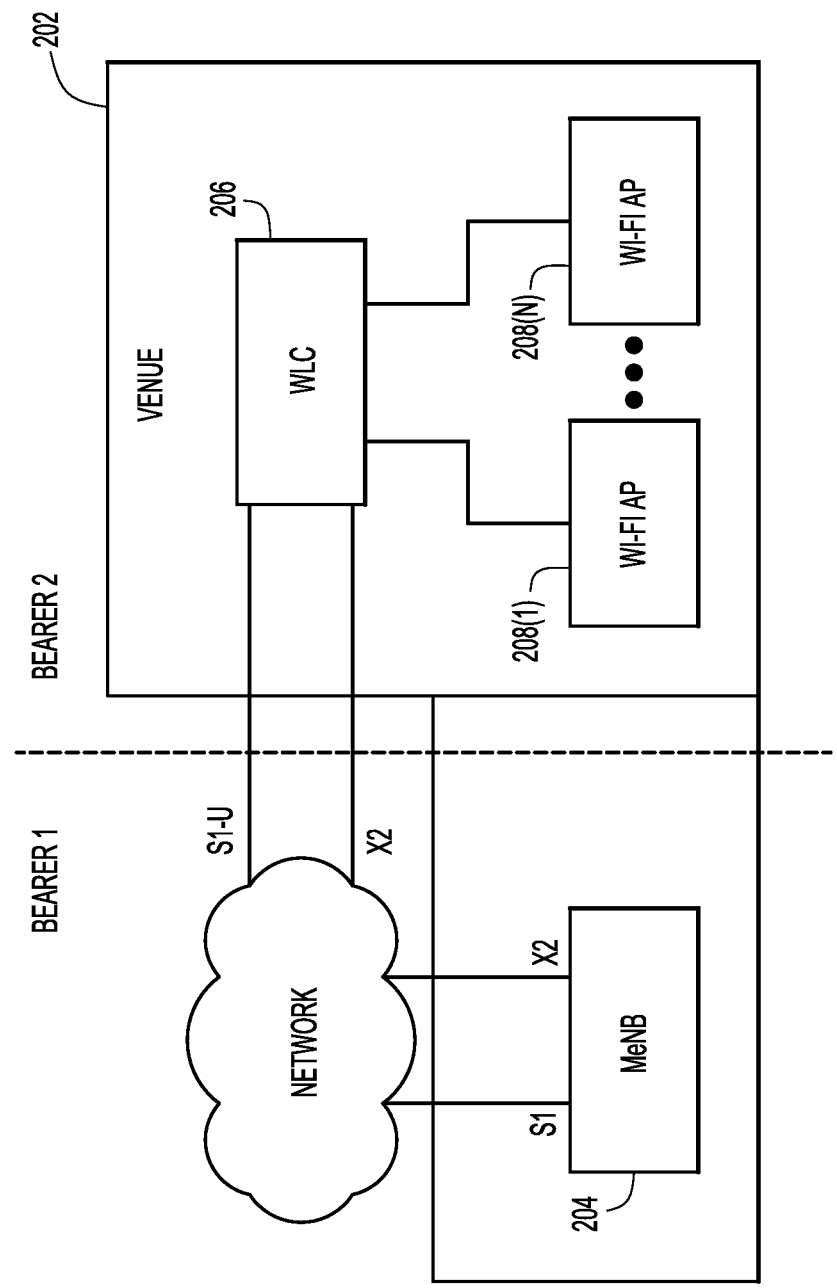
FIG. 2 is a block diagram illustrating a Dual Bearer data path model according to an example embodiment.

Referring to FIG. 2, there is shown a block diagram illustrating connectivity of a Dual Bearer data path model, according to one embodiment. As shown in FIG. 2, a venue 202 may host one or more network devices that provide the network services offered by bearer 1 and bearer 2. The one or more network devices may comprise a MeNB 204, a WLC 206 and one or more Wi-Fi Access Points (APs) 208 (e.g., 208(1), to 108(N), N being an integer larger than or equal to one). Bearer 1 may provide LTE services and bearer 2 may provide Wi-Fi services. Also, similar to MeNB 104, the MeNB 204 may comprise one or more LTE APs. Further, the WLC 206 may be hosted in a network device that also hosts one Wi-Fi AP 208. The venue 202 may also be any facility either with open access or restricted access by the general public, such as but not limited to, a school campus, a train station, an airport, a stadium, a hotel, etc. Although not shown, any user device (UE) at or near the venue 202 may establish a WWAN connection with the MeNB 204 and a WLAN connection with the WLC 206 (via one of the Wi-Fi AP 208).

In one embodiment, as shown in FIG. 2, the Dual Bearer data path may include two LTE S1 signaling transport connections to a network (e.g., an EPC): one from the MeNB and another from the WLC 206 (of the SeNB). The MeNB 204 may be a MeNB for a macro cell.

Figure 3A:
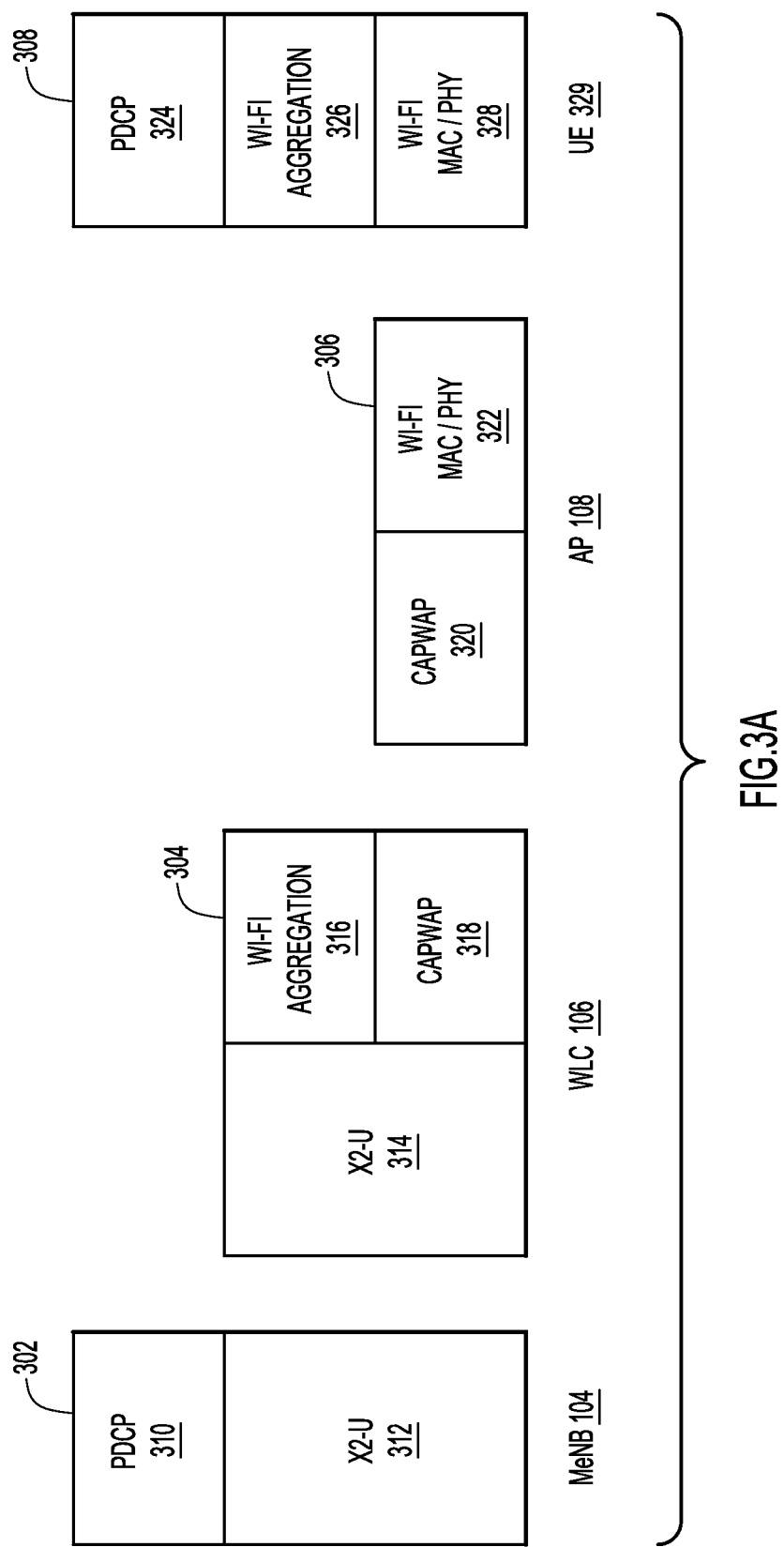

Referring now to FIG. 3A, example network stacks for the Split Bearer data path model in the MeNB 104, WLC 106, Wi-Fi Access Point (AP) 108 and a UE 329 are shown, according to one embodiment. The UE 329 may be a user device at or near the venue 102, and may establish a WWAN connection with the MeNB 104 and a WLAN connection with the WLC 106 via one of the Wi-Fi AP 108. The MeNB 104 may comprise a LTE network stack 102 that includes a PDCP layer 310 and an X2 User Plane (X2-U) layer 312. The WLC 106 may comprise a Wi-Fi network stack 304 that includes an X2-U layer 314, a Wi-Fi aggregation function layer 316 and a Control And Provisioning of Wireless Access Points (CAPWAP) layer 318. The X2-U layers 312 and 314 may communicate with each other to form the X2 connection shown in FIG. 1. The Wi-Fi aggregation function layer 316 may be on top of the CAPWAP layer 318, and together they are at the same level as the X2-U layer 314.

The AP 108 may comprise a network stack 306 that includes a CAPWAP layer 320 and a Wi-Fi MAC/PHY layer 322. The CAPWAP layers 318 and 320 may form the connection between the WLC 106 and each AP 108 as shown in FIG. 1. The Wi-Fi MAC/PHY layer 322 may represent the combination of the Wi-Fi MAC layer and the Wi-Fi physical (PHY) layer for the AP 108.

The UE 329 may comprise a network stack 308 that includes a PDCP layer 324, a Wi-Fi aggregation function layer 326 and a Wi-Fi MAC/PHY layer 328. The PDCP layer 324 may be at the same level as the PDCP layer 302 in the network stack 302 of the MeNB 104. The Wi-Fi aggregation function layer 326 may be at the same level as the Wi-Fi aggregation function layer 316 in the network stack 304 of the WLC 106. The Wi-Fi MAC/PHY layer 328 may represent the combination of the Wi-Fi MAC layer and the Wi-Fi PHY layer for the UE 329. The Wi-Fi MAC/PHY layer 328 may be at the same level as the Wi-Fi MAC/PHY layer 322 of the AP 108. The Wi-Fi MAC/PHY layer 328 and the Wi-Fi MAC/PHY layer 322 may form a wireless connection between the AP 108 and UE 329.

Referring to FIG. 3B, example network stacks in a control plane for the Split Bearer data path model in the MeNB 104, WLC 106, and Wi-Fi Access Point (AP) 108 are shown, according to one embodiment. The MeNB 104 may comprise a network stack 330 in the control plane. The network stack 330 may include a X2 Application Protocol (X2-AP) layer 336, which may also be referred to as the X2 Control Plane (X2-CP) layer 336. The WLC 106 may comprise a network stack 332 in the control plane. The network stack 332 may include a X2-AP layer 338 and a CAPWAP layer 340. The X2-AP layer 338 may also be referred to as the X2-CP layer 338. The AP 108 may comprise a network stack 334 in the control plane. The network stack 334 may include a CAPWAP layer 342. The X2-AP layer 336 and the X2-AP layer 338 may form a control plane connection between the MeNB 104 and the WLC 106. The CAPWAP layer 340 and the CAPWAP layer 342 may form a control plane connection between the WLC 106 and the AP 108.

Figure 4A:
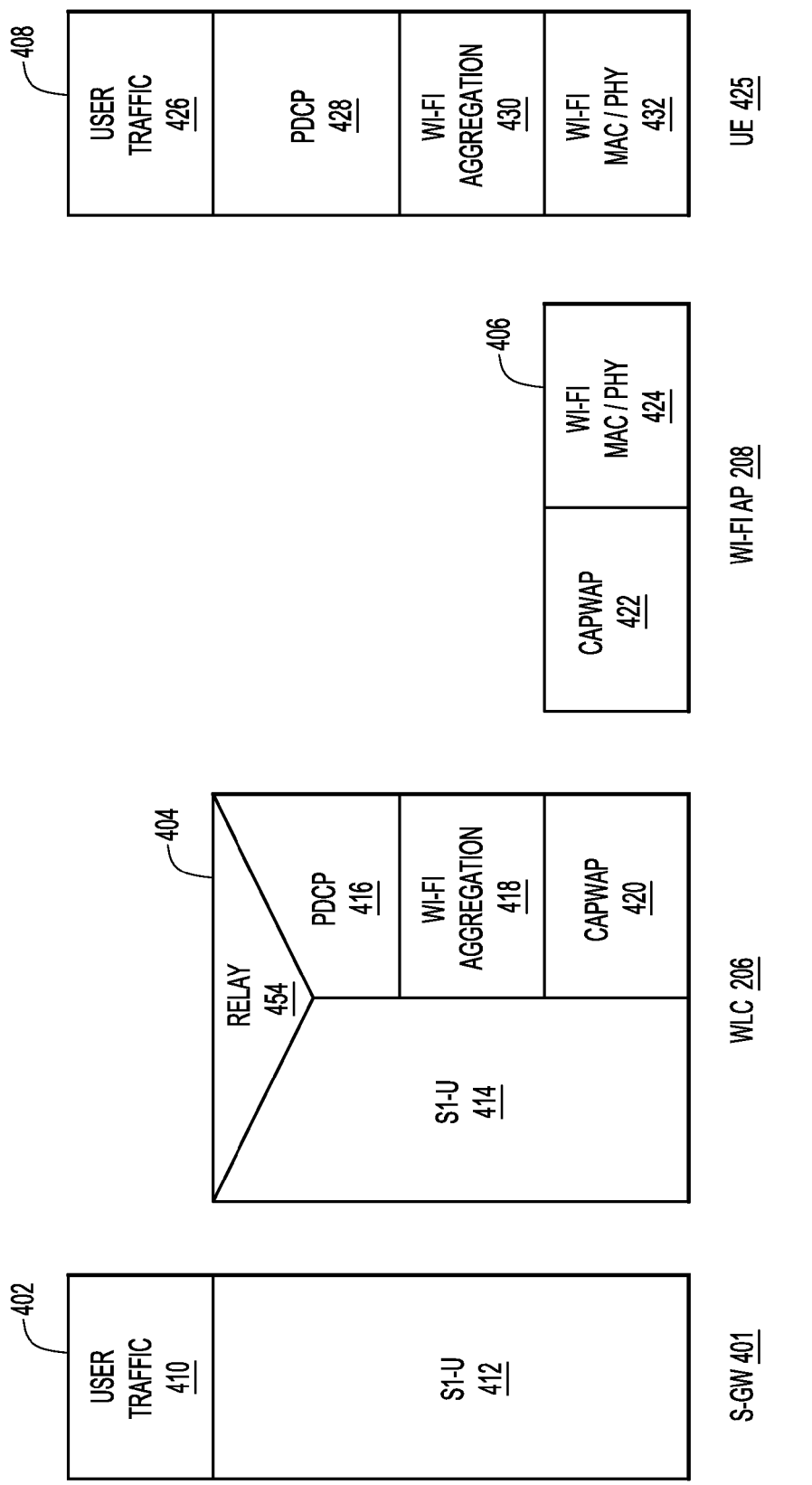

Referring now to FIG. 4A, example network stacks for the Dual Bearer data path model in a servicing-gateway (S-GW) 401, the WLC 206, the Wi-Fi Access Point (AP) 208 and a UE 425 are shown, according to one embodiment. The UE 425 may be a user device at or near the venue 202, and may establish a WWAN connection with the MeNB 204 and a WLAN connection with the WLC 206 via one of the Wi-Fi AP 208. The S-GW 401 may be a gateway in the core network of FIG. 2 that services the MeNB 204 and WLC 206. As shown in FIG. 4A, the S-GW 401 may comprise a network stack 402 that includes a User Traffic layer 410 and a S1-U interface layer 412. The WLC 206 may comprise a network stack 404 that includes a S1-U interface layer 414, a Relay layer 454, a PDCP layer 416, a Wi-Fi aggregation function layer 418 and a CAPWAP layer 420. The S1-U layers 412 and 414 may communicate with each other to form the S1 connection between the WLC 206 and the network shown in FIG. 2. The Relay layer 454 may convert protocol service data units (SDUs) from one network system to other network system as used in the 3GPP specification. The PDCP layer 416, the Wi-Fi aggregation function layer 418 and the CAPWAP layer 420 may form a Wi-Fi network stack for the WLC 206, and together they are at the same level as the S1-U layer 414.

The Wi-Fi AP 208 may comprise a network stack 406 that includes a CAPWAP layer 422 and a Wi-Fi MAC/PHY layer 424. The CAPWAP layers 420 and 422 may form the connection between the WLC 206 and each AP 208 as shown in FIG. 2. The Wi-Fi MAC/PHY layer 424 may represent the combination of the Wi-Fi MAC layer and the Wi-Fi PHY layer for the AP 208.

The UE 425 may comprise a network stack 408 that includes a User Traffic layer 426, PDCP layer 428, a Wi-Fi aggregation function layer 430 and a Wi-Fi MAC/PHY layer 432. The User Traffic layer 426 may be at the same level as the User Traffic layer 410 of the S-GW 401. The PDCP layer 428 may be at the same level as the PDCP layer 416 in the network stack 404 of the WLC 206. The Wi-Fi aggregation function layer 430 may be at the same level as the Wi-Fi aggregation function layer 418 in the network stack 404 of the WLC 206. The Wi-Fi MAC/PHY layer 432 may represent the combination of the Wi-Fi MAC layer and the Wi-Fi PHY layer for the UE 425. The Wi-Fi MAC/PHY layer 432 may be at the same level as the Wi-Fi MAC/PHY layer 424 of the AP 208. The Wi-Fi MAC/PHY layer 424 and the Wi-Fi MAC/PHY layer 432 may form a wireless connection between the AP 208 and UE 425.

Referring to FIG. 4B, example network stacks in a control plane for the Dual Bearer data path model in the MeNB 204, WLC 206, and Wi-Fi Access Point (AP) 208 are shown, according to one embodiment. The MeNB 204 may comprise a network stack 440 in the control plane. The network stack 440 may include a X2-AP layer 446, which may also be referred to as the X2-CP layer 446. The WLC 206 may comprise a network stack 442 in the control plane. The network stack 442 may include a X2-AP layer 448 and a CAPWAP layer 450. The X2-AP layer 448 may also be referred to as the X2-CP layer 448. The AP 208 may comprise a network stack 444 in the control plane. The network stack 444 may include a CAPWAP layer 452. The X2-AP layer 446 and the X2-AP layer 448 may form a control plane connection between the MeNB 204 and the WLC 206. The CAPWAP layer 450 and the CAPWAP layer 452 may form a control plane connection between the WLC 206 and the AP 208.

Figure 4C:
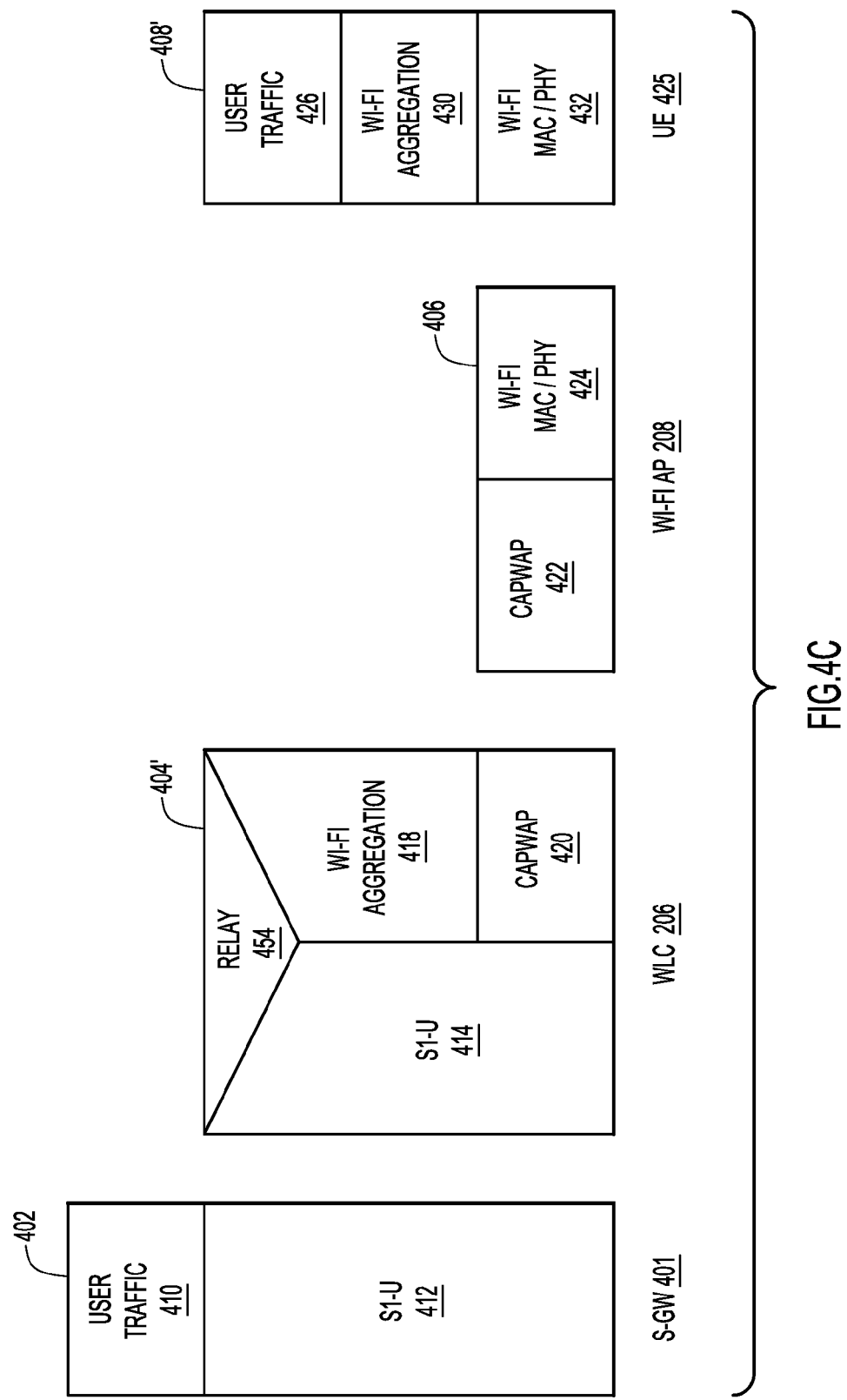
FIG. 4C is a block diagram illustrating layer processing in various system elements for the Dual Bearer data path model according to another example embodiment.

Referring now to FIG. 4C, example network stacks for the Dual Bearer data path model in a servicing-gateway (S-GW) 401, the WLC 206, the Wi-Fi Access Point (AP) 208 and a UE 425 are shown, according to another embodiment. In FIG. 4C, the network stack 402 of S-GW 401 and the network stack 406 of Wi-Fi AP 208 may be the same a in FIG. 4A. The WLC 206 in FIG. 4C, however, may comprise a network stack 404' that includes the S1-U interface layer 414, the Wi-Fi aggregation function layer 418, the CAPWAP layer 420, and the Relay layer 454. In addition, the UE 425 in FIG. 4C may comprise a network stack 408' that includes the User Traffic layer 426, Wi-Fi aggregation function layer 430 and the Wi-Fi MAC/PHY layer 432. The S1-U layers 412 and 414 may communicate with each other to form the S1 connection between the WLC 206 and the network shown in FIG. 2. In this embodiment, the data path may be directly established between the S-GW 401 and WLC 206. For example, S1-U may directly transfer packets to the CAPWAP without going through the PDCP layer. And thus, the PDCP layer 416 and PDCP layer 428 shown in FIG. 4A may not be necessary in this embodiment and may be skipped.

It should be appreciated that the network stacks shown in FIGS. 3A, 3B and 4A-4C and described above may be portions of full network stacks. Other portions of the full network stacks are not affected by the LTE/Wi-Fi DC implementation and thus omitted to simplify the description.

Figure 5:
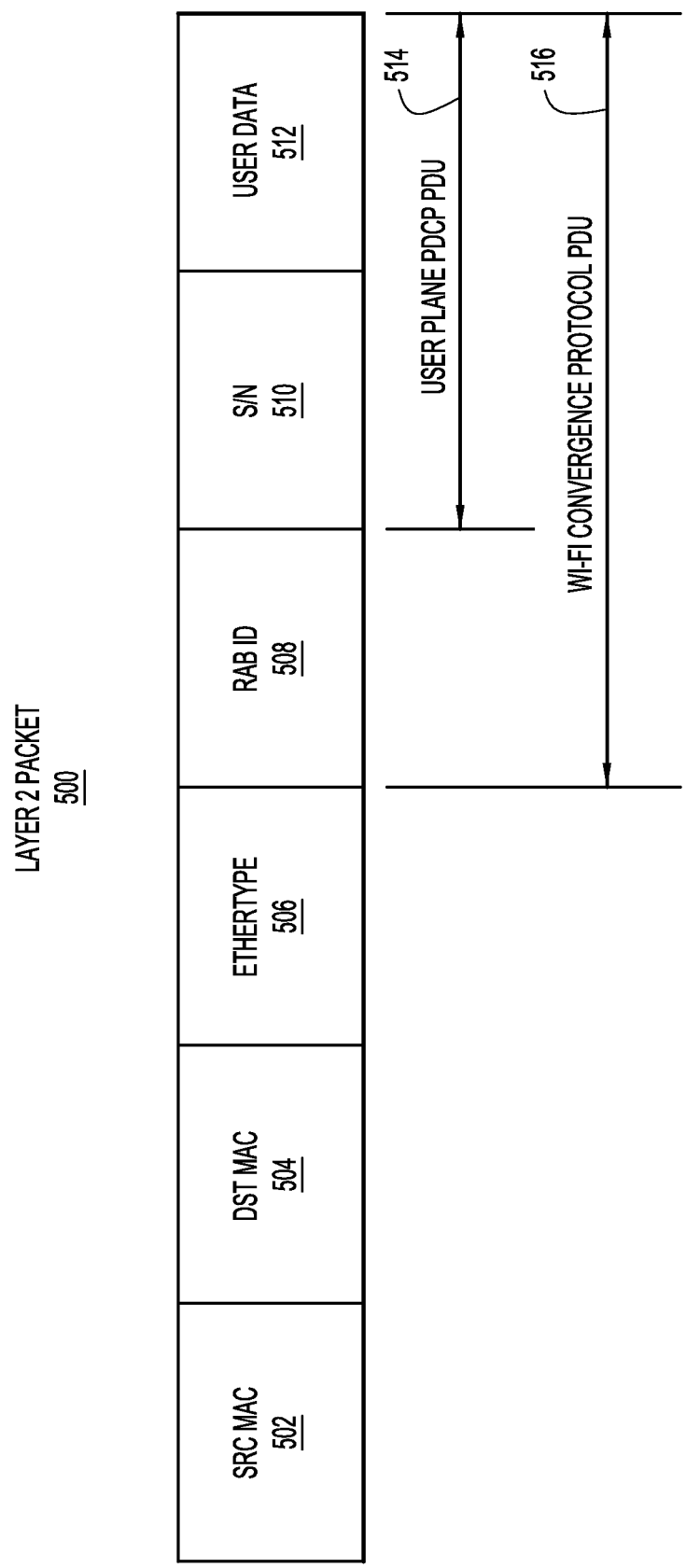
FIG. 5 is a block diagram illustrating a Layer 2 packet including fields to support Packet Data Convergence Protocol (PDCP) aggregation, according to an example embodiment.

With reference to FIG. 5, there is an illustration of an example Layer 2 packet 500 to implement PDCP aggregation. As depicted in FIG. 5, the Layer 2 packet 500 may comprise a source MAC field 502, a destination MAC field 504, an EtherType field 506, a RAB ID field 508, a sequence number field 510 and a user data field 512. The source MAC field 502 and destination MAC field 504 may contain the source MAC address and destination MAC address of the packet 500. The EtherType field 506 may be a two-octet field that indicates which protocol is encapsulated in the payload of the Ethernet Frame. In one embodiment, a new EtherType value may be defined for PDCP-based LTE and Wi-Fi aggregation. The RAB ID field 508 may contain a RAB identifier (ID) that identifies the RAB for a packet 500. Thus, multiple Radio Access Bearers (RABs) may be multiplexed because each RAB may have a unique RAB ID for their respective Layer 2 packets. The sequence number field 510 may contain a sequence number for in-order delivery and/or assembly of packets and the user data field 512 may contain user data payload. Collectively, the sequence number field 510 and the user data field 512 may form a user plane PDCP Protocol Data Unit (PDU) 514; and the RAB ID field 508 and the user plane PDCP PDU 514 may form a Wi-Fi Convergence Protocol PDU 516.

In some embodiments, traffic for multiple User Equipments (UEs) may be multiplexed using the UE Wi-Fi MAC addresses. For example, for a packet transmitted by a UE, the Wi-Fi MAC address of the UE is in the source MAC field 502; and for a packet destined for a UE, the Wi-Fi MAC address of the UE is in the destination MAC field 504.

In various embodiments of PDCP layer aggregation, enhancements may be made to Radio Resource Control. For example, RRC may be modified to set up the secondary channel, such as to exchange UE and AP MAC addresses for the Wi-Fi Convergence Protocol, and to also exchange Service Set Identifier (SSID) and Basic SSID (BSSID) information. In some embodiments, Radio Resource Control may also be used to establish rules for determining what traffic to send on Wi-Fi versus LTE.

Figure 6:
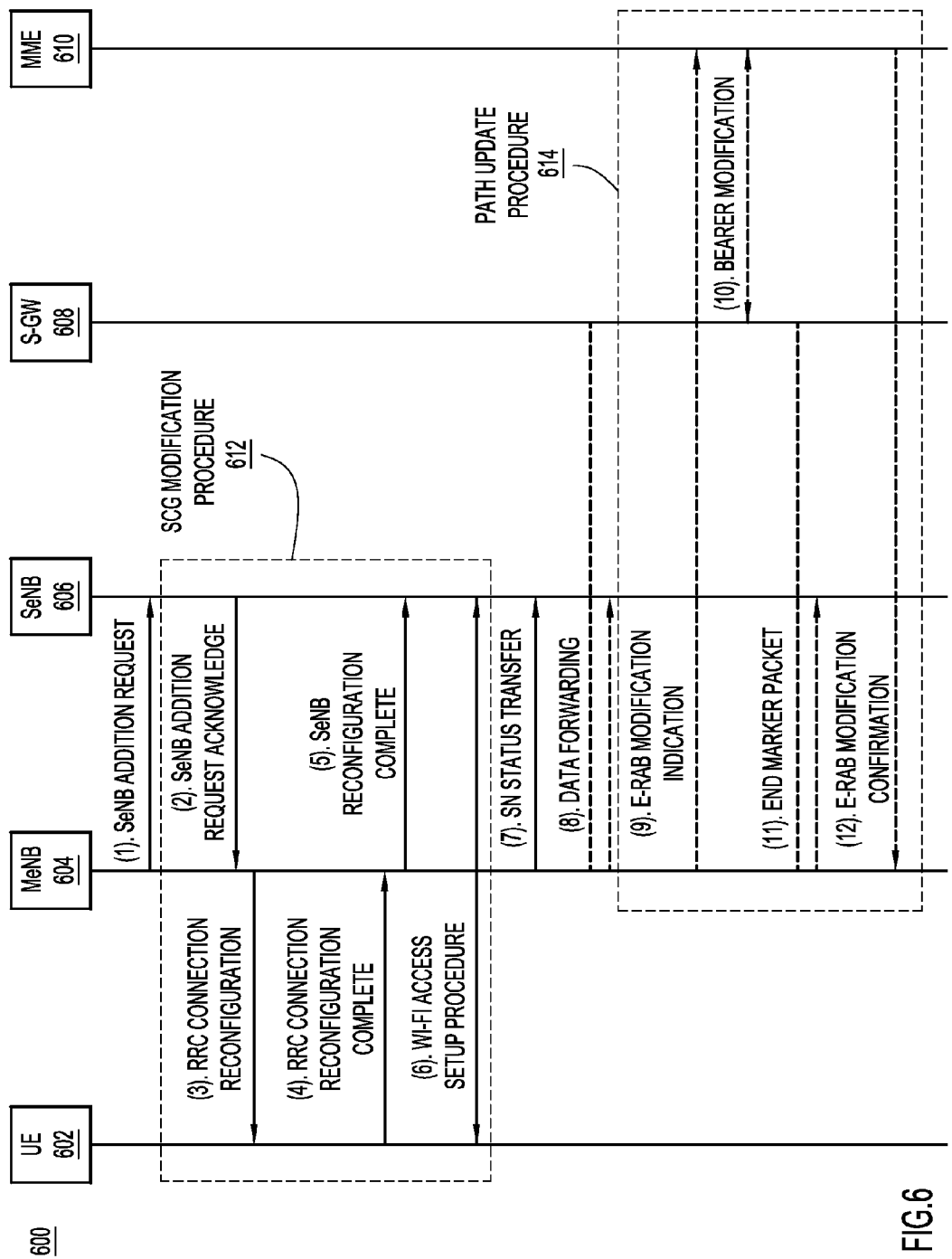
FIG. 6 is a sequence diagram illustrating signaling between system elements for establishing a Wi-Fi based Secondary eNodeB according to an example embodiment.

With reference to FIG. 6, there is shown a sequence diagram illustrating signaling between entities within a system 600 for establishing a Wi-Fi based Secondary eNodeB according to an example embodiment. The entities of system 600 involved in establishing a Wi-Fi based Secondary eNodeB may comprise a UE 602, a MeNB 604, a SeNB 606, a S-GW 608 and a Mobility Management Entity (MME) 610. The signaling between these entities may be illustrated by reference numerals (1)-(12) as shown in FIG. 6.

At (1), the MeNB 604 may send a SeNB Addition Request to the SeNB 606. In one embodiment, the SeNB Addition Request may carry SmartCell Gateway (SCG) configuration information. Moreover, in one embodiment, the SeNB Addition Request may contain a client Wi-Fi MAC address. For example, a new RRC identity message may be implemented and the MeNB 604 may send a RRC identity message to the UE 602 and the UE 602 may respond with its Wi-Fi MAC address, which may be included in the SeNB Addition Request by the MeNB 602.

At (2), the SeNB 606 may send a SeNB Addition Request Acknowledge to the MeNB 604. The MeNB 604 may, at (3), send a RRC Connection Reconfiguration request to the UE 602, and the UE 602 may, at (4), respond to the MeNB 604 with a RRC Connection Reconfiguration Complement message. In one embodiment, the RRC Connection Reconfiguration request may comprise an IEEE 802.11k element, for example, SSID or a BSSID. At (5), the MeNB 604 may send a SeNB Reconfiguration Complete message to the SeNB 606. Then, at optional (6), a Wi-Fi Access Setup Procedure may be performed. It should be noted that signaling for the Wi-Fi Access Setup Procedure may be bi-directional between the UE 602 and SeNB 606. The Wi-Fi Access Setup Procedure may be used to set up association and perform authentication. In one embodiment, the signaling of (2), (3), (4), (5) and optional (6) may be collectively referred to as a SCG Modification Procedure 612.

At (7), the MeNB 604 may signal the SeNB 606 with the Sequence Number (SN) Transfer to communicate the sequence number information to the SeNB 606, which may be used for in order delivery/assembly of packets. At (8), data may be received from the S-GW 608 at the MeNB 604 and forwarded to the SeNB 606 for delivery to the UE 602. It should be appreciated that data forwarded to the SeNB 606 may be portion of the total data received from the S-GW 608 because the MeNB 604 may also communicate portion of the total data received from the S-GW 608 with the UE 602. Moreover, there may also be data transmitted by the UE 602 and received by either the MeNB 604 or SeNB 606. If some packets of data are transmitted by the UE 602 to the MeNB 604, the MeNB 604 may forward the received data directly to the S-GW 608. If some other packets of data are transmitted by the UE 602 to the SeNB 606, the SeNB 606 may forward the data to the MeNB 604 and then the MeNB 604 may aggregate the data forwarded by the SeNB 606 with any data directly received by the MeNB 604 and forward the combined data (e.g., with a correct order) to the S-GW 608.

The signaling between the entities of the system 600 may also include a Path Update Procedure 614, which may be used to notify the MME 610 of establishment of the SeNB 606 as a bearer for wireless communication with the UE 602. The Path Update Procedure 614 may start the signaling at (9), at which the MeNB 604 may send an Evolved-Radio Access Bearer (E-RAB) Modification Indication to the MME 610. In one embodiment, the E-RAB Modification Indication may be an update to the MME 610 to add the second network device as a radio access bearer (RAB) for communication with the user device. At (10), the MME 610 and S-GW 608 may communicate with each other with Bearer Modification messages. At (11), the S-GW 608 may send an End Marker Packet to the MeNB 604, which may be forwarded by the MeNB 604 to the SeNB 606. At (12), the MME 610 may send an E-RAB Modification Confirmation to the MeNB 604.

Figure 7:
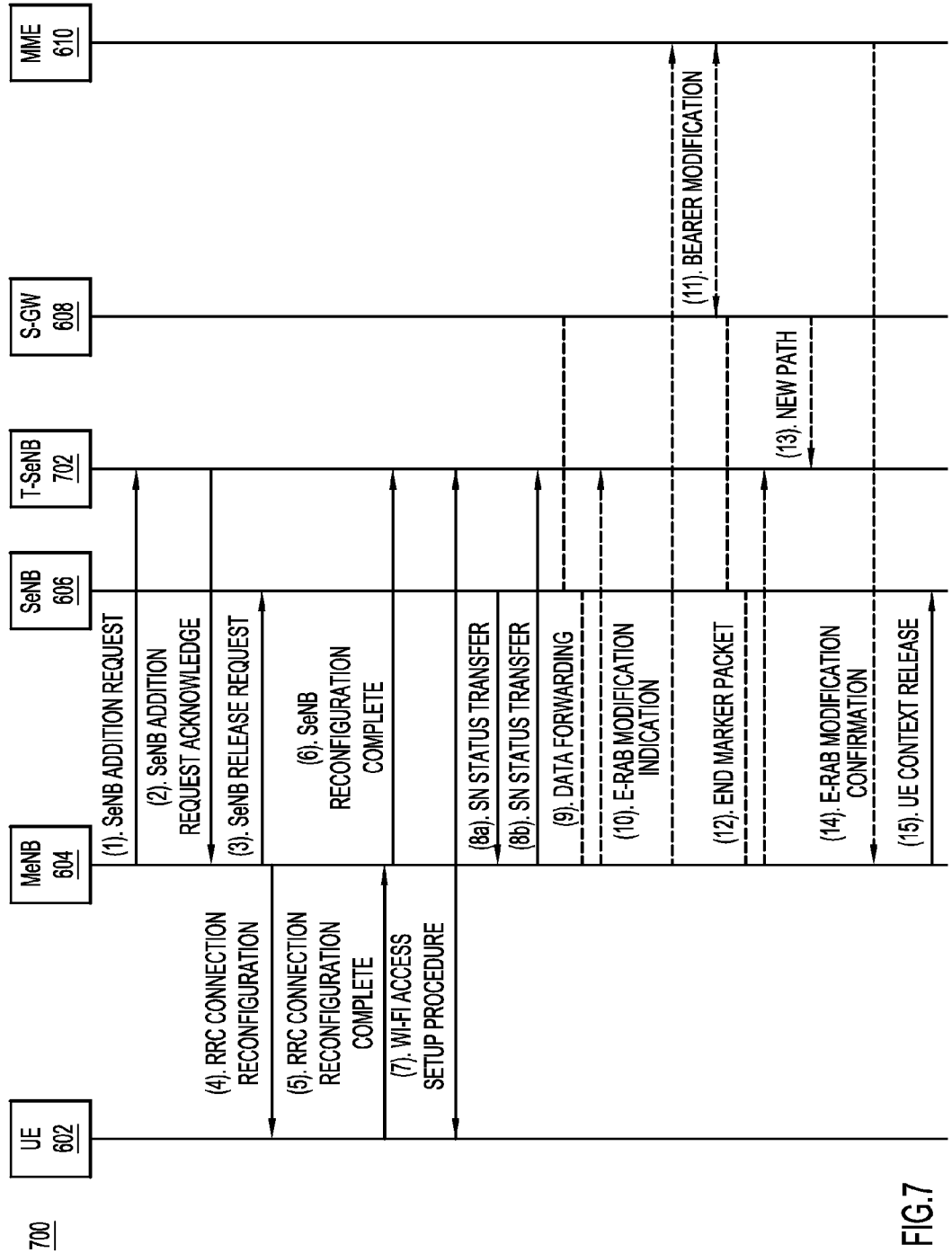
FIG. 7 is a sequence diagram illustrating signaling between system elements for handover between two Secondary eNodeB elements according to an example embodiment.

With reference to FIG. 7, there is shown a sequence diagram illustrating signaling for a handover from a first Secondary eNodeB (SeNB 606) to a second SeNB (T-SeNB 702) within a system 700 according to an example embodiment. The system 700 may include all entities of the system 600 and further include the T-SeNB 702. The signaling between these entities may be illustrated by reference numerals (1)-(15) as shown in FIG. 7.

At (1), the MeNB 604 may send a SeNB Addition Request to the T-SeNB 702. In one embodiment, the T-SeNB 702 may include a WLC that operates at least one access point. At (2), the T-SeNB 702 may send a SeNB Addition Request Acknowledge to the MeNB 604. The acknowledgement may contain a SSID for a WLAN operated by the T-SeNB 702. At (3), the MeNB 604 may send a SeNB Release Request to the SeNB 606. The Release Request may release the SeNB 606 from communicating with the UE 602 on behalf of the MeNB 604. In one embodiment, the SeNB Release Request may contain the Wi-Fi MAC address of the UE 602. The MeNB 604 may, at (4), send a RRC Connection Reconfiguration request to the UE 602, and the UE 602 may, at (5), respond to the MeNB 604 with a RRC Connection Reconfiguration Complement message. In one embodiment, the RRC Connection Reconfiguration request sent at (4) may contain the SSID for the WLAN operated by the T-SeNB 702 to configure the UE 602 to set up a WLAN connection via the T-SeNB 702. At (6), the MeNB 604 may send a SeNB Reconfiguration Complete message to the T-SeNB 702. Then, at optional (7), a Wi-Fi Access Setup may be performed. It should be noted that signaling for the Wi-Fi Access Setup Procedure at the optional (7) may be bi-directional between the UE 602 and T-SeNB 702. The Wi-Fi Access Setup Procedure may be used to set up association and perform authentication.

At (8a), the SeNB 606 may signal the MeNB 604 with the Sequence Number (SN) Transfer to communicate the sequence number status to the MeNB 604. At (8b), the MeNB 604 may signal the T-SeNB 702 with the sequence number status, thus ensuring in order delivery/assembly of packets with the T-SeNB 702 replacing the SeNB 606. At (9), data may be received from the S-GW 608 at the MeNB 604 and forwarded to the T-SeNB 702 for delivery to the UE 602. It should be appreciated that data forwarded to the T-SeNB 702 may be portion of the total data received from the S-GW 608 because the MeNB 604 may also communicate portion of the total data received from the S-GW 608 with the UE 602. Moreover, there may also be data transmitted by the UE 602 and received by either the MeNB 604 or T-SeNB 702. If some packets of data are transmitted by the UE 602 to the MeNB 604, the MeNB 604 may forward the received data directly to the S-GW 608. If some other packets of data are transmitted by the UE 602 to the T-SeNB 702, the T-SeNB 702 may forward the data to the MeNB 604 and then the MeNB 604 may aggregate the data forwarded by the T-SeNB 702 with any data directly received by the MeNB 604 and forward the combined data (e.g., with correct order) to the S-GW 608.

At (10), the MeNB 604 may send an E-RAB Modification Indication to the MME 610. At (11), the MME 610 and S-GW 608 may communicate with each other with Bearer Modification messages. At (12), the S-GW 608 may send an End Marker Packet to the MeNB 604, which may be forwarded by the MeNB 604 to the T-SeNB 702. At (13), the S-GW 608 may establish a new path to the T-SeNB 702. At (14), the MME 610 may send an E-RAB Modification Confirmation to the MeNB 604. At (15), the MeNB 604 may send a UE Context Release message to the SeNB 606. In one embodiment, the UE Context Release message may contain the Wi-Fi MAC address of the UE 602.

Figure 8:
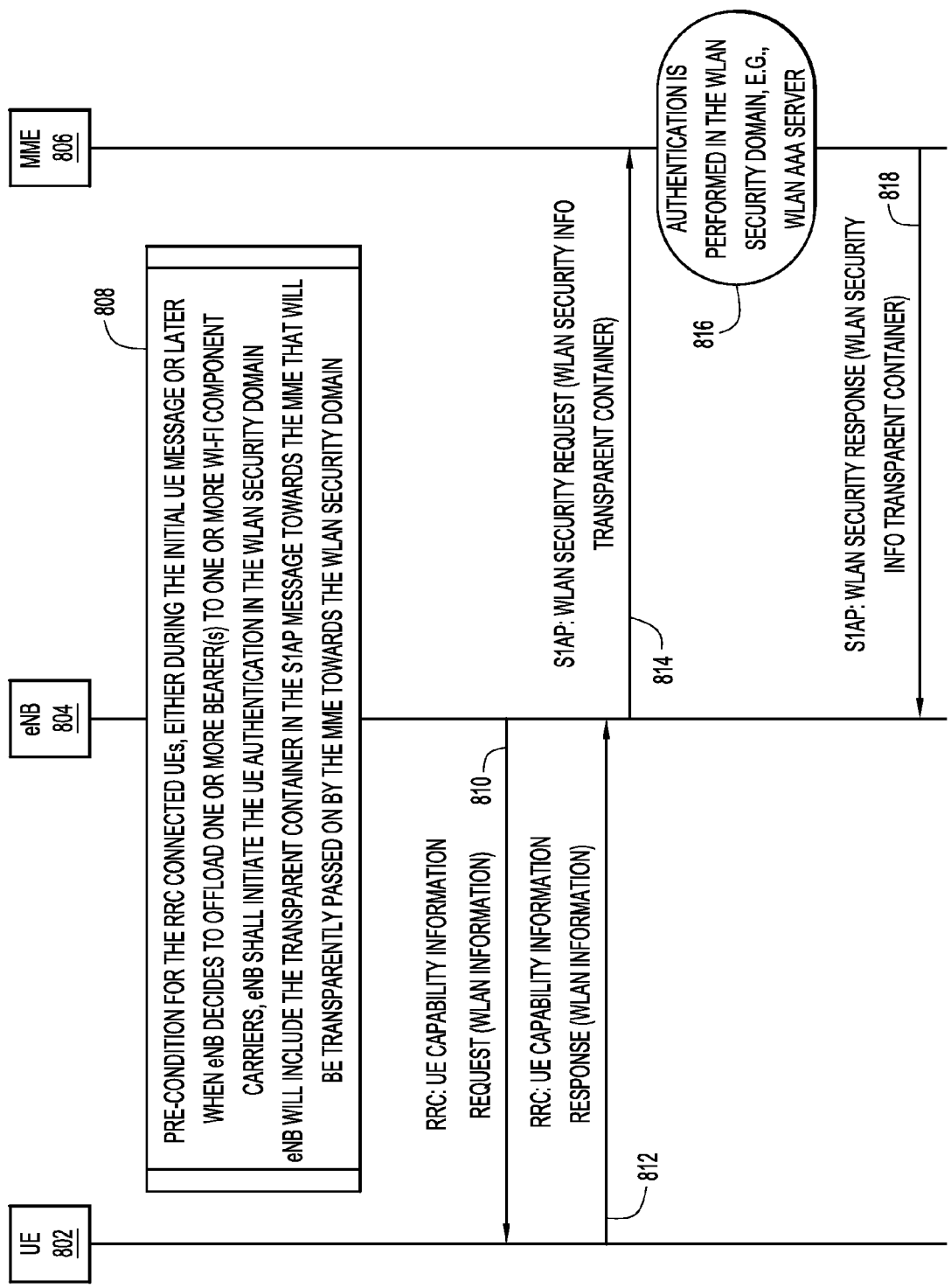
FIG. 8 is a sequence diagram illustrating signaling between system elements for wireless local area network (WLAN) authentication according to an example embodiment.

With reference to FIG. 8, there is shown a sequence diagram illustrating signaling between entities of a system 800 for wireless local area network (WLAN) authentication according to an example embodiment. The system 800 may comprise a UE 802, an eNB 804 and a MME 806. The eNB 804 may be an embodiment of the MeNB as described herein (e.g., MeNB 104, MeNB 204, MeNB 604, etc.). The MeNB 804 may implement security features as shown in block 808, which includes, for example, a pre-condition for the RRC connected UEs and a mechanism about performing LTE-WLAN interworking for security. The pre-condition for the RRC connected UEs may require that the eNB 804 initiates the UE authentication in the WLAN security domain either during the initial UE message or later when the eNB decides to offload one or more bearer(s) to one or more Wi-Fi Component carriers. Moreover, the eNB may include a transparent container in a S1 Application Protocol (S1AP) message towards the MME that will be transparently passed on by the MME towards a WLAN security domain for security verification.

As shown in FIG. 8, at 810, the eNB 804 may send a RRC request for UE Capability Information. The RRC request may request WLAN information of the UE 802. At 812, the UE 802 may respond with a RRC response for UE Capability Information. The RRC response may include the WLAN information of the UE 802 requested by the eNB 804.

At 814, the eNB 804 may send a S1AP message to the MME 806. The S1AP message may be a WLAN Security Information transparent container that contains a WLAN Security Request. At 816, authentication may be performed in a corresponding WLAN security domain, for example, a WLAN authentication, authorization, and accounting (AAA) server. It should be noted that the WLAN AAA server may be co-located as the MME 806 but may also be hosted at a machine or location different from the MME 806. Moreover, the WLAN AAA server may exchange messages with the UE 802, for example, via the MME 806 (not shown). At 818, the MME 806 may send a S1AP response back to the eNB 804. The S1AP response may be a WLAN Security Information transparent container that contains a WLAN Security Response.

It should be appreciated that implementing the signaling in FIGS. 6-8 may involve changes to the LTE Rel. 12 specification. In addition to the features described above, there may be other changes to RRC, such as, but not limited to, a RRC Measurement Report (containing a new Wi-Fi Measurement Report based on IEEE 802.11k), a RRC Neighbor List Message (e.g., for providing a list of Wi-Fi SSID, Roaming Consortium Id (HS2.0)), a Radio Link Failure Message (e.g., a new message from UE on LTE to indicate Wi-Fi failure so that UE can report Secondary Link Failure). In one embodiment, for example, a MeNB may receive a Radio Link Failure Message as a notification from a UE that the WLAN connectivity via a WLC may have failed There are also modifications to the X2 Ethernet link, for example, for providing Client statistics (packets transmitted/received, etc.) to assist the MeNB (for the Split Bearer embodiments) to determine how to load balance the traffic between LTE and Wi-Fi.

For security considerations, in at least one embodiment, a separate SSID may be used for DC. The SSID may be open (e.g., without WLAN security) and security may implement MAC authentication. The MeNB may provide the SeNB the MAC address of the UE. Non-authorized UEs are sent an Association Reject message. The User Plane Traffic is secure based on PDCP ciphering, which may be done based on keys provided by the MeNB, so that the user traffic is always secure.

In another embodiment, the SSID may be IEEE 802.1x based. A user device (UE) may use Extensible Authentication Protocol-Tunneled Transport Layer Security (EAP-TTLS) with the eNB key (KeNB) as the shared key. This may require eNB to behave as an AAA server and generate a Pairwise Master Key (PMK) for the Wi-Fi session. User plane traffic is still encrypted at the PDCP layer (and at Wi-Fi layer). The implementation of the security mechanisms may ensure that UE and Wi-Fi AP do mutual authentication Reference is now made to FIG. 9 for a description of an example implementation of a MeNB and SeNB to provide DC in a system 900. The system 900 may comprise a MeNB 902 and a WLC 912. The MeNB 902 may comprise one or more processor(s) 904, a memory 906 and one or more network interface unit(s) 908. The WLC 912 may comprise one or more processor(s) 914, a memory 916 and one or more network interface unit(s) 918. The MeNB 902 may implement a LTE network stack as described herein and may be configured to obtain the Wi-Fi AP details, including BSSID and/or SSID of the any Wi-Fi APs controlled by the WLC 912. Aggregation traffic flows between the Ethernet interface between the MeNB 902 and WLC 912. In the system 900, Layer 2 of the network stack in either LTE stack, Wi-Fi stack, or both may be used to discover client connectivity. For example, Layer 2 discovery, Address Resolution Protocol (ARP), can be used for UE discovery. In one embodiment, Gratuitous ARP (GARP) may be initiated from either the MeNB 902 or a Wi-Fi AP under the control of the WLC 912.

The memory 906 and 916 may each individually include read only memory (ROM), random access memory (RAM), magnetic disk storage media devices, optical storage media devices, flash memory devices, electrical, optical, or other physical/tangible memory storage devices. Thus, in general, the memory 906 and 916 may each individually comprise one or more tangible (non-transitory) computer readable storage media (e.g., a memory device) encoded with software comprising computer executable instructions and when the software is executed (by the processor 904 and 914 respectively) it is operable to perform the operations described herein, in connection with FIGS. 1-8 and 10, when executing the software stored in the memory 906 and/or 916.

The processor 904 and 914 may each individually be a microprocessor or a microcomputer, for example. The network interface unit(s) 908 and 918 may each individually include one or more network interface cards that enable network communications. For example, the network interface unit(s) 908 of the MeNB 902 may comprise one network interface Eth 0 for a connection to the evolved packet core (EPC), another network interface Eth1 for a connection to the WLC 912, and one or more wireless network interface units for wireless communication with UEs; and the network interface unit(s) 918 of the WLC 912 may comprise one network interface Eth 0 for a connection to the local breakout (which may be optional because a split bear does not need the Eth 0 connection), another network interface Eth 1 for a connection to the MeNB 902, and one or more wireless network interface units for communication with Wi-Fi APs.

Figure 9:
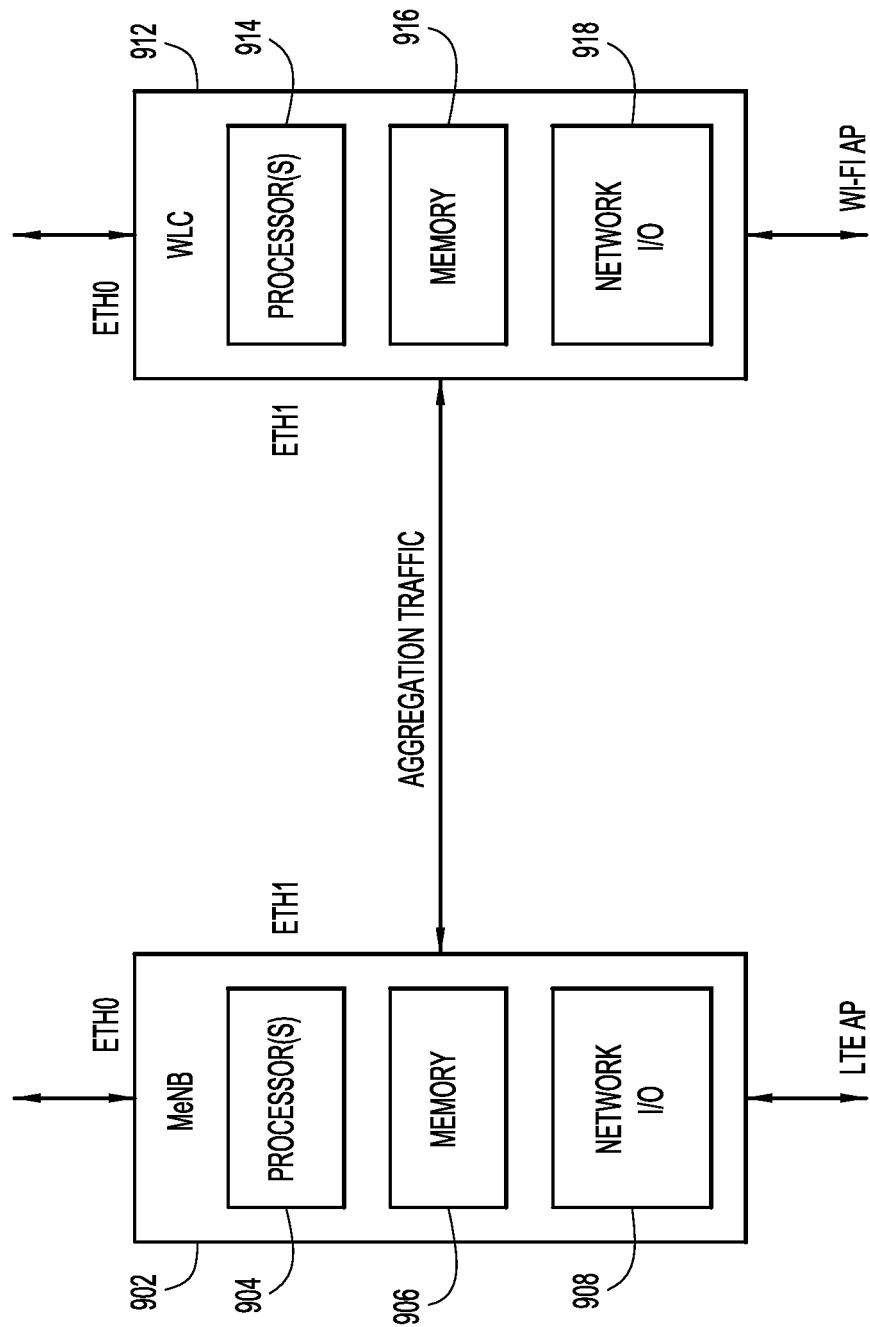
FIG. 9 is a block diagram illustrating a physical implementation of a MeNB and an SeNB, according to an example embodiment.

It should be appreciated that in other embodiments, the MeNB 902, WLC 912, or both, may include fewer or more components apart from those shown in FIG. 9. For example, part or whole network stack (e.g., LTE and/or Wi-Fi) including the aggregation logic may be in the form of firmware that is processed by Application Specific Integrated Circuits (ASICs), and may be integrated into a circuit board. Alternatively, part or whole network stack (e.g., LTE and/or Wi-Fi) including the aggregation logic may be in the form of one or more logic blocks included in a programmable logic device (e.g., a field-programmable gate array (FPGA)). Moreover, in one embodiment, the MeNB 902 and WLC 912 may be combined in one computing apparatus such that one processor (or one set of processors) and one memory, or one set of ASIC or FPGA may be used to implement the part or whole network stack (e.g., LTE and/or Wi-Fi) including the aggregation logic. If MeNB 902 and WLC 912 are combined in one computing apparatus, in one embodiment, aggregation traffic between them may be implemented using known techniques for inter-process communication in a computing system. The modifications or additions to the structures described in relation to FIG. 9 to implement these alternative or additional functionalities are appreciated by those skilled in the art, having the benefit of the present specification and teachings.

Figure 10:
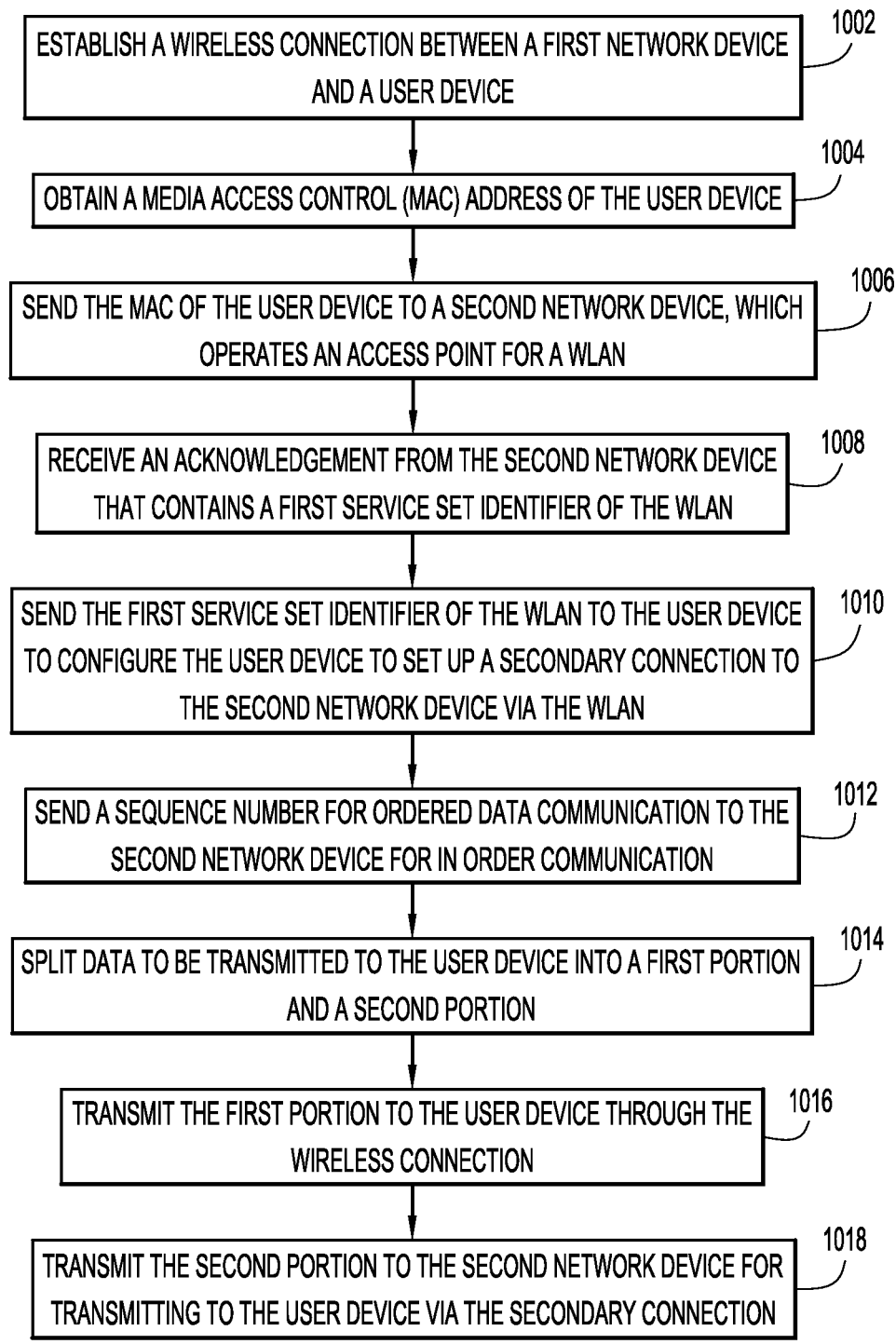
FIG. 10 is a flow chart illustrating, at a high level, operations performed for providing dual connectivity using a LTE MeNB and a Wi-Fi SeNB, according to an example embodiment.

Reference is now made to FIG. 10 for a description of a high-level flow chart of a method 1000 for providing dual connectivity using a LTE MeNB and a Wi-Fi SeNB according to the techniques presented herein. At 1002, a first network device may establish a wireless connection with a user device. The first network device may be a configured to operate as a base station in a wireless wide area network (e.g., a MeNB) and the user device may be a UE. The wireless connection may be a wireless wide area network connection. At 1004, a MAC address of the user device may be obtained. At 1006, the MAC address of the user device may be sent to a second network device which operates an access point for a WLAN. The second network device may implement a WLC which may operate as a secondary eNB. At 1008, an acknowledgement may be received from the second network device that contains a first service set identifier of the WLAN. At 1010, the first service set identifier of the WLAN may be sent to the user device to configure the user device to set up a secondary connection to the second network device via the WLAN. In one embodiment, the first service set identifier of the WLAN may be sent to the user device as part of Radio Resource Control (RRC). At 1012, a sequence number for ordered data communication may be sent to the second network device for in order communication. At 1014, data to be transmitted to the user device may be split into a first portion and a second portion. At 1016, the first portion may be transmitted to the user device through the wireless connection and at 1018, the second portion may be transmitted to the second network device for transmitting to the user device via the secondary connection.

To summarize, methods are provided for providing Dual Connectivity using LTE in MeNB and Wi-Fi in SeNB with two alternatives: (1) Split Bearer (at PDCP layer) with PDCP aggregation at the MeNB and Wi-Fi aggregation Layer at the WLC; and (2) Dual Bearer with Ethernet S1-U and PDCP/WLC-aggregation at the WLC. Changes to the RRC layer and X2layer may be implemented as described herein. In one embodiment, a Wi-Fi aggregation layer may perform delivery of multiple RABs over a single Wi-Fi connection.

In summary, in one form, a method is provided comprising: at a first network device configured to operate as a base station in a wireless wide area network: establishing a wireless wide area network connection with a user device; obtaining a media access control (MAC) address of the user device; sending the MAC address of the user device to a second network device which operates an access point for a wireless local area network (WLAN); receiving an acknowledgement from the second network device, the acknowledgement containing a first service set identifier of the WLAN; sending the first service set identifier to the user device to configure the user device to set up a secondary connection to the first network device via the WLAN and the second network device; sending an identifier for ordered data communication to the second network device to enable communication through both the first network device and the second network device; splitting data to be transmitted to the user device into a first portion and a second portion; transmitting the first portion of the data to the user device through the wireless wide area network connection; and transmitting the second portion of the data to the second network device for transmission to the user device via the WLAN.

In another form, an apparatus is provided comprising a network interface unit configured to enable communications over a network; a memory; a processor coupled to the network interface unit and the memory, wherein the processor is configured to: establish a wireless wide area network connection with a user device; obtain a media access control (MAC) address of the user device; send the MAC address of the user device to a network device which operates an access point for a wireless local area network (WLAN); receive an acknowledgement from the network device, the acknowledgement containing a first service set identifier of the WLAN; send the first service set identifier to the user device to configure the user device to set up a secondary connection to the apparatus via the WLAN and the network device; send an identifier for ordered data communication to the network device to enable communication through both the apparatus and the network device; split data to be transmitted to the user device into a first portion and a second portion; transmit the first portion of the data to the user device through the wireless wide area network connection; and transmit the second portion of the data to the network device for transmission to the user device via the WLAN.

In yet another form, one or more non-transitory computer readable storage media are provided encoded with instructions that, when executed by a processor, cause the processor to: establish a wireless wide area network connection between a first network device configured to operate as a base station in a wireless wide area network with a user device; obtain a media access control (MAC) address of the user device; send the MAC address of the user device to a second network device which operates an access point for a wireless local area network (WLAN); receive an acknowledgement from the second network device, the acknowledgement containing a first service set identifier of the WLAN; send the first service set identifier to the user device to configure the user device to set up a secondary connection to the first network device via the WLAN and the second network device; send an identifier for ordered data communication to the second network device to enable communication through both the first network device and the second network device; split data to be transmitted to the user device into a first portion and a second portion; transmit the first portion of the data to the user device through the wireless wide area network connection; and transmit the second portion of the data to the second network device for transmission to the user device via the WLAN.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a first network device configured to operate as a base station in a wireless wide area network:
establishing a wireless wide area network connection with a user device;
obtaining a media access control (MAC) address of the user device;
sending the MAC address of the user device to a second network device which operates an access point for a wireless local area network (WLAN);
receiving an acknowledgement from the second network device, the acknowledgement containing a first service set identifier of the WLAN;
sending the first service set identifier to the user device to configure the user device to set up a secondary connection to the first network device via the WLAN and the second network device;
sending an identifier for ordered data communication to the second network device to enable communication through both the first network device and the second network device;
splitting data to be transmitted to the user device into a first portion and a second portion;
transmitting the first portion of the data to the user device through the wireless wide area network connection; and
transmitting the second portion of the data to the second network device for transmission to the user device via the WLAN.

2. The method of claim 1, wherein sending the first service set identifier of the WLAN to the user device is performed as part of Radio Resource Control (RRC).

3. The method of claim 1, further comprising sending an update to a Mobility Management Entity to add the second network device as a radio access bearer (RAB) for communication with the user device.

4. The method of claim 1, further comprising:
sending the MAC address of the user device to a third network device which operates a second access point;
receiving an acknowledgement from the third network device, the acknowledgement containing a second service set identifier;
sending a release request containing the MAC address of the user device to the second network device to release the second network device from communicating with the user device on behalf of the first network device; and
sending the second service set identifier to the user device to configure the user device to set up a wireless local area network connection via the third network device.

5. The method of claim 1, further comprising:
receiving packets of data from the user device via both the wireless wide area network connection and the WLAN; and
aggregating the packets of data for transmitting to a core network.

6. The method of claim 1, wherein the first network device and the second network device belong to a same bearer and are connected via an X2 interface.

7. The method of claim 6, wherein the first network device is a Master evolved NodeB (MeNB) for a small cell.

8. The method of claim 1, wherein the first network device and the second network device belong to different bearers, and the first network device is a Master evolved NodeB (MeNB) for a macro cell.

9. The method of claim 1, further comprising receiving a notification from the user device that WLAN connectivity via the second network device has failed.

10. An apparatus comprising:
a network interface unit configured to enable communications over a network;
a memory;
a processor coupled to the network interface unit and the memory, wherein the processor is configured to:
establish a wireless wide area network connection with a user device;
obtain a media access control (MAC) address of the user device;
send the MAC address of the user device to a network device which operates an access point for a wireless local area network (WLAN);
receive an acknowledgement from the network device, the acknowledgement containing a first service set identifier of the WLAN;
send the first service set identifier to the user device to configure the user device to set up a secondary connection to the apparatus via the WLAN and the network device;
send an identifier for ordered data communication to the network device to enable communication through both the apparatus and the network device;
split data to be transmitted to the user device into a first portion and a second portion;
transmit the first portion of the data to the user device through the wireless wide area network connection; and
transmit the second portion of the data to the network device for transmission to the user device via the WLAN.

11. The apparatus of claim 10, wherein the processor is configured to send the first service set identifier of the WLAN to the user device is performed as part of Radio Resource Control (RRC).

12. The apparatus of claim 10, wherein the processor is configured to:

send the MAC address of the user device to another network device which operates a second access point;
receive an acknowledgement from the another network device, the acknowledgement containing a second service set identifier;
send a release request to the network device to release the network device from communicating with the user device on behalf of the apparatus; and
send the second service set identifier to the user device to configure the user device to set up a wireless local area network connection via the another network device.

13. The apparatus of claim 10, wherein the apparatus and the network device belong to a same bearer and are connected via an X2 interface, and the apparatus is a Master evolved NodeB (MeNB) for a small cell.

14. The apparatus of claim 10, wherein the apparatus and the network device belong to different bearers, and the apparatus is a Master evolved NodeB (MeNB) for a macro cell.

15. One or more non-transitory computer readable storage media encoded with instructions that, when executed by a processor, cause the processor to:
establish a wireless wide area network connection between a first network device configured to operate as a base station in a wireless wide area network with a user device;
obtain a media access control (MAC) address of the user device;
send the MAC address of the user device to a second network device which operates an access point for a wireless local area network (WLAN);
receive an acknowledgement from the second network device, the acknowledgement containing a first service set identifier of the WLAN;
send the first service set identifier to the user device to configure the user device to set up a secondary connection to the first network device via the WLAN and the second network device;
send an identifier for ordered data communication to the second network device to enable communication through both the first network device and the second network device;
split data to be transmitted to the user device into a first portion and a second portion;
transmit the first portion of the data to the user device through the wireless wide area network connection; and
transmit the second portion of the data to the second network device for transmission to the user device via the WLAN.

16. The non-transitory computer readable storage media of claim 15, wherein instructions that cause the processor to send the first service set identifier include instructions that cause the processor to send the first service set identifier of the WLAN to the user device is performed as part of Radio Resource Control (RRC).

17. The non-transitory computer readable storage media of claim 15, wherein the instructions further cause the processor to:
send the MAC address of the user device to a third network device which operates a second access point;
receive an acknowledgement from the third network device, the acknowledgement containing a second service set identifier;
send a release request to the second network device to release the second network device from communicating with the user device on behalf of the first network device; and
send the second service set identifier to the user device to configure the user device to set up a wireless local area network connection via the third network device.

18. The non-transitory computer readable storage media of claim 15, wherein the first network device and the second network device belong to a same bearer and are connected via an X2 interface, and the first network device is a Master evolved NodeB (MeNB) for a small cell.

19. The non-transitory computer readable storage media of claim 15, wherein the first network device and the second network device belong to different bearers, and the first network device is a Master evolved NodeB (MeNB) for a macro cell.

20. The non-transitory computer readable storage media of claim 15, wherein the instructions further cause the processor to receive a notification from the user device that WLAN connectivity via the second network device has failed.

* * * * *